United States Patent [19]

Switala

[11] 4,254,452
[45] Mar. 3, 1981

[54] LIGHTED TRAY APPARATUS

[76] Inventor: Gary P. Switala, 3890 Pondview Dr., Hanover Park, Ill. 60103

[21] Appl. No.: 973,868

[22] Filed: Dec. 28, 1978

[51] Int. Cl.³ .............................................. F21V 33/00
[52] U.S. Cl. .................................... 362/154; 362/101
[58] Field of Search .................. 362/31, 96, 97, 101, 362/127, 154, 190, 191, 252, 806

[56] References Cited

U.S. PATENT DOCUMENTS

| | | | |
|---|---|---|---|
| 2,114,460 | 4/1938 | Ziegler | 362/154 |
| 2,582,781 | 1/1952 | Johnson | 362/101 X |
| 3,013,852 | 12/1961 | Rockola | 362/97 X |
| 3,162,375 | 12/1964 | Huston | 362/31 |
| 3,378,680 | 4/1968 | Moxley | 362/191 X |
| 3,705,982 | 12/1972 | Smolinski | 362/97 X |

*Primary Examiner*—Peter A. Nelson
*Attorney, Agent, or Firm*—McCoy & Morris

[57] ABSTRACT

A dispensing tray for use in mobile recreational vehicles and vans having a tray portion cutout which forms a receptacle for storing loose change and the like and including a number of racks for holding articles such as ashtrays and beverage containers. The racks are releasably mounted to the tray and are supported on a number of pedestals. Small light bulbs are located under each pedestal. Colored discs are located between the pedestal bottoms and the light bulbs to color the light from the bulbs which illuminate the racks, supporting pedestals, receptacle and tray. A continuous insulated, metallic strip is attached to the underside of the tray for electrically interconnecting the light bulbs to the electrical system of the vehicle and to facilitate assembly. At least one plexiglass light piping member is positioned at the periphery of the cutout and at least one light bulb is adjacent thereto, which transmits and disperses the light from the bulb throughout the change receptacle.

10 Claims, 4 Drawing Figures

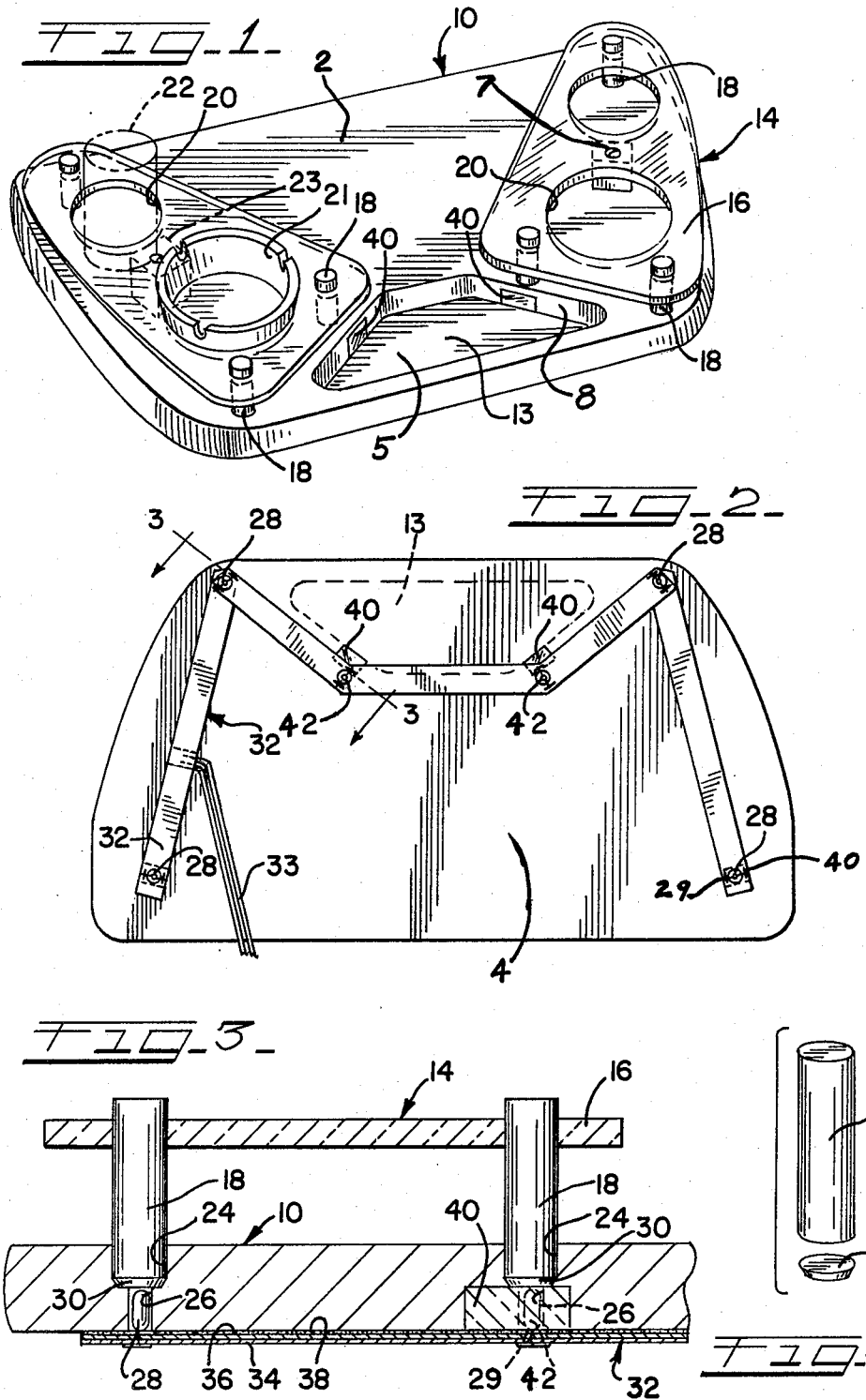

LIGHTED TRAY APPARATUS

BACKGROUND OF THE INVENTION (1) Field of the Invention

This disclosure pertains to a tray and dispensing member for use in recreational vehicles, vans and the like and which is usually positioned adjacent to the driver and includes portions for storage of coins, astrays, beverage containers, and which has an internal lighting system which illuminates the tray area and operates in conjunction with light piping means which illuminates the change receptacle area to provide an attractive, functional member.

(2) Description of the Prior Art

While prior art devices have suggested the use of trays adjacent to the driver's area in vehicles, these trays have generally provided nothing more than a flat tray section surrounded by upstanding edges intended to prevent the articles in the tray from sliding or falling off the tray should the vehicle swerve or lurch. Various lighting systems have been used with the prior art devices such as small lights located above and adjacent the tray which may be turned on or off as needed. A problem with such a device is that the light often times is too bright and unattractive for continuous use and often times only lights up a small portion of the tray. The lighting system of these devices requires several bulbs to adequately light the entire tray. The prior art has also shown a tray with beverage racks raised from the surface of the tray and providing openings for storage of beverage containing receptacles. The prior art has also shown a lighting system which transmits a light beam through the rack-supporting pedestals which light the pedestals and the openings within the beverage racks.

However, the prior art does not provide trays for storage of change and miscellaneous items which are also lighted through the use of a light piping arrangement. Additionally, the prior art does not show colored-disc inserts which may be positioned at the bottom of the rack-supporting pedestals and which alter the color of the light being transmitted through the unit. Further, the prior art does not disclose an insulated strip of conductive tape which electrically interconnects the spaced light bulbs to each other and to a power source in the vehicle.

SUMMARY

This invention pertains to a dispensing tray for use in motor vehicles such as vans and recreational vehicles. In particular, the subject matter of this invention shows a lighted tray having at least one beverage-supporting rack having a frame spaced above the tray and having cutouts to receive beverage containers, ashtrays, and the like. The tray also includes at least one cutout forming a receptacle for the storage of miscellaneous small items such as loose change and the like. Small light bulbs are positioned under the beverage rack-supporting pedestals and adjacent at least one light piping member located at the periphery of the change receptacle so that when the light bulbs are energized, light is directed throughout the change receptacle and the rack-supporting pedestals to illuminate the tray and beverage racks.

A continuous strip of insulated metallic tape is attached to the underside of the tray and includes a first paper layer which is mounted to the tray, a second layer which is a metallic conductive material and a third plastic layer which insulates the second layer. The terminals or leads of the light bulbs are stapled to said strip to complete the lighting circuit.

The beverage racks are releasably mounted to the tray and include a number of cylindrically-shaped supporting pedestals having a first end mounted to the rack and a second end spaced from the first end which is force fitted within an opening on the top side of the tray. Before inserting the pedestals into their respective openings, a colored disc, corresponding with the motif or color arrangement of the vehicle, is inserted into each pedestal opening, to color the light being transmitted through the rack-supporting pedestal and tray area.

It is an object of this disclosure to show a tray for motor vehicles which comprises an electric circuit and lighting arrangement that allows the tray, beverage-supporting racks and change receptacles to be lighted in an attractive, color-coordinated fashion.

It is another object of this disclosure to provide a lighted beverage tray having at least one receptacle for supporting and storing miscellaneous items such as coins, sunglasses, pens, pencils, and the like.

It is another object of this disclosure to provide a portable, removable unit that may be removed from the vehicle when it is sold and fitted into subsequent vehicles. It is also an object to provide a tray having a number of beverage racks that are removable and can be replaced with other racks having different configurations and openings depending upon the size of the containers or ashtrays that are to be received therein.

These and other objects of the invention will become apparent to those of ordinary skill in the art with reference to the following description, drawing, and claims.

DESCRIPTION OF THE DRAWINGS

FIG. 1 is a perspective view of the tray and components thereof;

FIG. 2 is a bottom, plan view showing the underside of the tray;

FIG. 3 is a view taken generally along section lines 3—3 of FIG. 2; and,

FIG. 4 is a removed, exploded view of a receptacle-supporting pedestal and the associated colored lens that may be inserted thereunder.

DESCRIPTION OF THE PREFERRED EMBODIMENT

Referring now to the drawing and in particular to FIG. 1, there is shown a tray 10 which is preferably made out of a wood laminated member having a scratch resistance top surface 2. A cutout section 13 provides a receptacle or dish area in the tray having a bottom 5 for storing change and miscellaneous small items. A pair of beverage racks 14 are releasably mounted to top surface 2 at each side of the tray 10, and includes a frame 16 which is supported on three cylindrically-shaped pedestals 18. The racks and pedestals are preferably made out of plexiglass. Frame 16 includes two openings 20 which are conveniently sized to receive cans of pop, ashtrays, coffee cups and the like. As shown in FIG. 1, ashtray 21 and glass 22 are shown inserted in their respective openings. A mounting member 23 is provided between each tray 10 and frame 16, and preferably includes a fastener or screw 7 which releasably secures frame 16 to the tray 10.

As shown in FIG. 3, tray 10 has a plurality of openings 24 which correspond to the positions of each pedestal 18. Each pedestal 18 is mounted within opening 24 which has a depth corresponding to approximately ⅛ to ¼ the thickness of tray 10. A smaller opening 26 is concentric with opening 24, and extends from the bottom 4 of tray 10 in communication with the larger opening 24. Light bulb 28 is positioned in each opening 26. Each bulb 28 has a pair of leads 29 extending from openings 26 which are stapled to a continuous metallic strip 32.

Plastic colored disc 30 is placed in each opening 24 and the racks and pedestals are then fitted into openings 24 and mounting member 23 is tightened by the user. Disc 30 provides a light-coloring effect for the light transmitted through pedestals 18, rack 14, and tray 10. Thus, the color of the illumination may be changed as often as the user desires by inserting different colored discs.

As shown in FIG. 1 and 3, at least one light piping or transmitting member 40 is mounted adjacent periphery 8 of receptacle 13 and operates in conjunction with light bulb 42 which is mounted adjacent member 40. When bulb 42 is energized, light will be transmitted through the light piping member 40 and into receptacle area 13. Piping member 40 is preferably constructed from plexiglass.

On bottom side 4 of the tray 10 there is shown a continuous strip of an electrical conductor 32, which is attached to power supply line 33 for obtaining power for the tray. (See FIG. 2). Strip 32 comprises three layers: the first layer 38 is paper having a thickness of 0.001" and is mounted to the bottom side 4 of tray 10 with suitable adhesive; the second layer 36 is a metallic foil, such as aluminum, copper or the like and has a thickness of 0.002"; the third layer 34 is mylar plastic which has a thickness of 0.002" and acts as an insulator of the electrical current passing through metallic layer 36. Light bulbs 26 and 42 are electrically mounted to strip 32 by stapling each lead 29 to strip 32. Staples 40 not only securely fasten the leads to the bottom of the tray, but also provide sufficient electrical contact with strip 32 without lessening the effect of the mylar insulation, thus making the electrical system very safe. An alternate embodiment of the electrical conducting means which performs the same function as strip 32 may comprise a Melemein circuit board which is coated with a metalized material, such as copper or the like. The bulbs and power supply line are preferrably "flow soldered" to the circuit board to complete the electrical connection. The board is then conventionally mounted to side 4 of tray 10.

Thus, it is shown by the disclosure that an efficient and functional, yet decorative, tray is provided which is low in cost because of the few parts and the simple method of assembly which does not require wiring each light individually. Once in position, the power supply line 33 may be easily attached to the vehicle's electrical circuit and the brightness of the lights can be controlled by a dash-mounted rheostat.

The foregoing description and drawing merely explain and illustrate the invention and the invention is not limited thereto, except insofar as the appended claims are so limited, as those who are skilled in the art and have the disclosure before them will be able to make modifications and variations therein without departing from the scope of the invention.

What is claimed is:

1. An improvement for a lighted tray for storing a plurality of items for use in vehicles having an electrical power source and comprising:

a tray member lying in a first plane and having a bottom side and a top side;

rack means lying in a second plane and comprising at least one frame having at least one opening for receiving at least one item;

pedestal means for releasably attaching said rack means to said tray member wherein said rack means is located at a spaced distance from said tray member and said first plane is parallel to said second plane;

means for releasably mounting said pedestal means to said top side of said tray member;

light means positioned substantially adjacent to said pedestal means for illuminating said pedestal means, said rack means and said tray member;

electrical conducting means mounted to said bottom side of said tray for electrically interconnecting said light means to the electrical power source of said vehicle; and, coloring means located between said light means and said pedestal means for selectively coloring the light which is transmitted from said light means to said pedestal means, said rack means, and said tray member.

2. The lighted tray of claim 1 wherein said pedestal means includes:

at least one post;

said post having a first end and a second end spaced apart from said first end;

said tray having means for releasably receiving the second end of said post;

means for mounting said first end of said post to said frame; and, said coloring means having means adapted for positioning said coloring means in said means for releasably receiving the second end of said post.

3. The lighted tray of claim 2 wherein said light means comprises a plurality of small light bulbs, each bulb having wire leads and each bulb located substantially adjacent said means for releasably receiving the second end of said post.

4. The lighted tray of claim 3 wherein said electrical conducting means comprises a continuous strip including insulating means and conducting means.

5. The lighted tray of claim 4 wherein said continuous strip further comprises:

a first layer comprising thin paper means mounted to the bottom side of said tray;

a second layer comprising a thin metallic foil;

a third layer comprising insulating means; and, means for mounting said strip to the bottom side of said tray.

6. The lighted tray of claim 4 wherein said electrical conducting means further comprises: staple means for conductively mounting each wire lead to said strip.

7. The lighted tray of claim 1 and further comprising:

cutout means comprising at least one receptacle means for the storage of said items;

said cutout means having a periphery;

said light means having means positioned substantially adjacent to said periphery for illuminating said receptacle means; and, said coloring means having means for selectively coloring the light which is transmitted from said light means to said receptacle means.

8. The lighted tray of claim 7 wherein said coloring means comprises at least one colored small disc.

9. The lighted tray of claim 7 and further comprising:

at least one light piping means located at the periphery of said cutout means; and, light means positioned substantially adjacent to said light piping means for transmitting light through said light piping means and thereby illuminating said receptacle means.

10. An improvement for a lighted tray for storing a plurality of items for use in vehicles having an electrical power source and comprising:

- a tray member having a top side lying in a first plane and having a bottom side;
- cutout means comprising at least one receptacle means for the storage of said items;
- said cutout means having a periphery;
- at least one frame member having at least one opening for receiving at least one item, said frame member lying in a second plane above the first plane;
- a plurality of cylindrically-shaped pedestals each having a first end and a second end spaced apart from said first end;
- means for mounting said first end of each pedestal to said frame;
- means for releasably mounting said second end of each pedestal into said tray member;
- said frame member being located at a spaced distance from said tray member wherein said first plane is parallel to said second plane;
- a plurality of light bulbs each having wire leads;
- means for mounting each bulb to the bottom side of said tray member and adjacent to a respective pedestal;
- a continuous electrical conducting strip having a paper first layer, said first layer having means for mounting the strip to the bottom of said tray, a metallic conducting second layer, and a plastic insulating third layer;
- means for conductively mounting each wire lead to said strip;
- means for electrically interconnecting said strip to the power source of said vehicle;
- a plurality of small colored discs each positioned between a respective bulb and pedestal;
- at least one light transmitting member located at the periphery of said cutout means;
- a light bulb positioned substantially adjacent said light transmitting member and having a wire lead; and,
- means for conductively mounting said lead of said second light bulb to said strip.

* * * * *